July 10, 1934.  H. C. OTWELL  1,966,309
MOUNTING FOR AIRCRAFT MOTORS
Filed Oct. 14, 1932
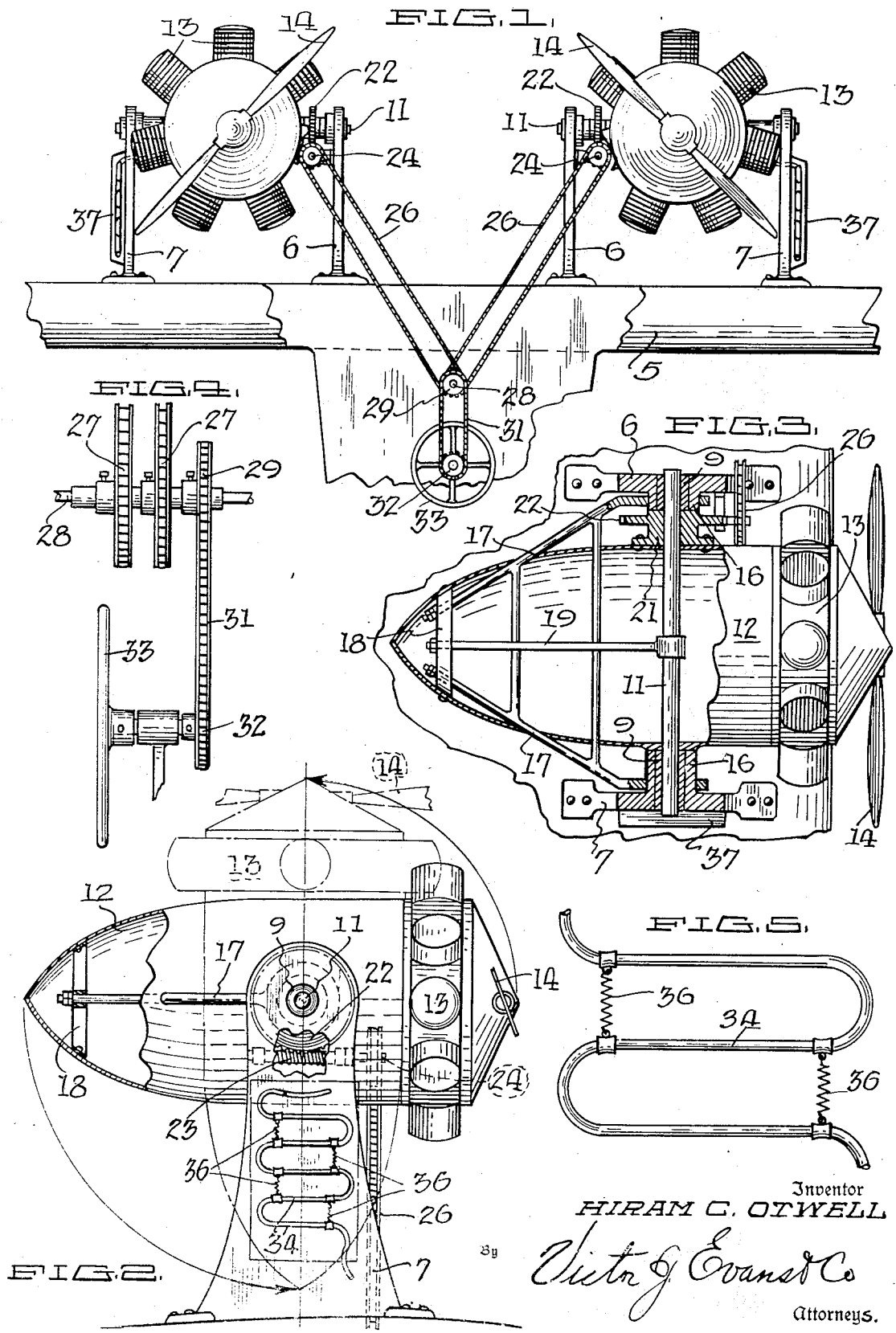
Inventor
HIRAM C. OTWELL
By Victor J. Evans & Co
Attorneys.

Patented July 10, 1934

1,966,309

UNITED STATES PATENT OFFICE 1,966,309

MOUNTING FOR AIRCRAFT MOTORS

Hiram C. Otwell, San Francisco, Calif.

Application October 14, 1932, Serial No. 637,846

1 Claim. (Cl. 244—25)

This invention relates to improvements in mountings for aircraft motors.

The principal object of this invention is to provide a mounting whereby the motor may be tilted so that the axis of the propeller may be changed with respect to the fuselage.

A further object is to provide means whereby there is practically no strain placed upon the operating mechanism, either during a period of change or a period of rest.

A further object is to produce a device which is economical to manufacture.

A still further object is to produce a device wherein the simultaneous movement of several motor mountings may be accomplished.

Other objects and advantages will be apparent during the course of the following description.

In the accompanying drawing forming a part of this specification and in which like numerals are employed to designate like parts throughout the same, Fig. 1 is a fragmentary front elevation of an airplane having a pair of motors mounted thereon and having my invention applied thereto, Fig. 2 is a side elevation of one of the motors showing the motor in two positions, one of which is in dotted lines, Fig. 3 is a top plan view of one of the motors and its mounting and shown partly in cross section, Fig. 4 is a fragmentary detail view showing the operating mechanism, and Fig. 5 is a fragmentary detail view showing the flexible fuel pipe and the manner of supporting the same.

As a rule airplane engines are mounted upon the fuselage in a rigid manner. The axis of the propeller generally is parallel with the longitudinal axis of the fuselage. This is a disadvantage for the reason that it often occurs in either leaving the ground or returning that it would be advantageous if the motors could be adjusted so as to give a slightly upward pull, thus lowering the speed of landing or reducing the run necessary with a heavy load and applicant has therefore devised a simple means whereby the axis of rotation of the propeller or propellers may be quickly changed so as to effect the desired result.

In the accompanying drawing wherein for the purpose of illustration is shown a preferred embodiment of my invention, the numeral 5 designates any portion of an airplane upon which standards 6 and 7 are secured. These standards may be of any desired configuration, the only purpose being that they support bushings 9 which journal a shaft 11. The shaft 11 extends through a streamline housing 12 to which the motor is secured. This motor is designated as a whole by the numeral 13 and is capable of revolving a propeller 14. The standards 6 and 7 each have bosses 16 which journal a brace frame 17. This brace frame has connection with a cross brace 18, and a connecting rod 19 in turn connects this cross brace 18 with the shaft 11.

Secured to the housing 12 is a casting 21 having a worm gear 22 formed integral therewith, which meshes with a worm 23 (see Fig. 2). This worm 23 is rotated by a sprocket wheel 24 over which a chain 26 is reaved. The chain 26 in turn is reaved over a sprocket wheel 27 mounted upon a shaft 28 located in any convenient point on the fuselage. If there are two engines it is obvious that there will be two chains 26 which will be reaved over two sprockets 27. A sprocket 29 is also secured to the shaft 28 and has a chain 31 which extends to a sprocket 32 which is connected to a hand-wheel 33. Therefore, by turning the hand-wheel 33 in either direction, motion will be transmitted through the chain 31 to the sprocket 29 to the shaft 28 to the sprocket 27 and thence through chains 26 to sprockets 24, worms 23 and gears 22. With the rotation of these gears about the shaft 11, it will be apparent that the streamline housing 12 and the attached engines together with their propellers will be rotated about the axis of the shaft 11. In order to transmit fuel to the engines a flexible fuel line is shown at 34 which is folded upon itself and springs 36 inserted between each adjacent fold so that the pipe may give and return as the engine is moved. This flexible pipe is preferably positioned within a housing 37 so as to be protected against damage.

It will thus be seen that I have produced a device which will accomplish all the objects above set forth.

It is to be understood that the form of my invention herewith shown and described is to be taken as a preferred example of the same and that various changes relative to the material, size, shape and arrangement of parts may be resorted to without departing from the spirit of the invention or the scope of the subjoined claim.

Having thus described my invention, I claim:—

In a device of the character described, a motor support, bosses formed on said support, a frame rotatable on said bosses, a shaft rotatably mounted in said supports, means for connecting said shaft to said frame, a housing connected to said frame, a gear mounted on said shaft and connected to said housing, the axis of the motor carried by said support being at right angles to the axis of said shaft, a worm engaging said gear and manual actuated means for rotating said worm from a remote point.

HIRAM C. OTWELL.